US011106058B2

(12) United States Patent
Rubin

(10) Patent No.: US 11,106,058 B2
(45) Date of Patent: Aug. 31, 2021

(54) HAND HELD TEMPLE BENDING TOOL

(71) Applicant: Bionic Thumb Tools, LLC, Voorhees, NJ (US)

(72) Inventor: Bruce Rubin, Voorhees, NJ (US)

(73) Assignee: Bionic Thumb Tools, LLC, Voorhees, NJ (US)

( * ) Notice: Subject to any disclaimer, the term of this patent is extended or adjusted under 35 U.S.C. 154(b) by 184 days.

(21) Appl. No.: 16/081,255

(22) PCT Filed: Feb. 22, 2017

(86) PCT No.: PCT/US2017/018785
§ 371 (c)(1),
(2) Date: Aug. 30, 2018

(87) PCT Pub. No.: WO2017/151355
PCT Pub. Date: Sep. 8, 2017

(65) Prior Publication Data
US 2019/0079319 A1 Mar. 14, 2019

Related U.S. Application Data

(60) Provisional application No. 62/303,442, filed on Mar. 4, 2016.

(51) Int. Cl.
G02C 13/00 (2006.01)
B29D 12/02 (2006.01)
G02C 5/20 (2006.01)
B25B 33/00 (2006.01)

(52) U.S. Cl.
CPC ............ *G02C 13/001* (2013.01); *B25B 33/00* (2013.01); *B29D 12/02* (2013.01); *G02C 5/20* (2013.01); *G02C 13/00* (2013.01)

(58) Field of Classification Search
CPC ........ G02C 13/001; G02C 5/20; G02C 13/00; B25B 33/00; B25B 5/14; B25B 27/00; B29D 12/02; B29C 67/00
See application file for complete search history.

(56) References Cited

U.S. PATENT DOCUMENTS

| 2,469,877 | A | * | 5/1949 | Haberman | B23K 3/053 228/44.3 |
| 2,516,512 | A | * | 7/1950 | Fitler | B29C 67/00 81/3.5 |
| 2,564,752 | A | * | 8/1951 | Collins | G02C 13/001 81/3.6 |
| 4,315,447 | A | * | 2/1982 | Tartaglia | B25B 7/02 81/185.1 |

(Continued)

Primary Examiner — Robert J Scruggs
(74) Attorney, Agent, or Firm — Norman E. Lehrer

(57) ABSTRACT

A hand held tool (10, 60, 70) for use by an optician in bending the temples (120) of a pair of eyeglasses includes an elongated handle portion (12, 62, 72) capable of being held in the palm of the optician's hand. A mandrel including a convexly formed anvil (14, 64, 74) with a nonslip upper surface (67, 77a) extends from a first end of the handle portion. A concavely formed thumb recess (16, 66, 76) is located adjacent the first end of the handle portion and is located opposite the anvil (14, 64, 74). The optician's thumb (100) fits within the recess when the handle portion is being held. The free end (110) of an eyeglass temple is placed over the mandrel (14, 64, 74) and is bent over the mandrel by the optician.

15 Claims, 3 Drawing Sheets

(56) References Cited

U.S. PATENT DOCUMENTS

| | | | | |
|---|---|---|---|---|
| 4,862,726 | A * | 9/1989 | Fooshee | B25B 5/163 72/409.01 |
| 8,707,833 | B1 * | 4/2014 | Gedeon | B25B 7/04 81/414 |
| 2007/0157770 | A1 * | 7/2007 | Foltyn | B25B 13/14 81/165 |
| 2009/0044847 | A1 * | 2/2009 | Barangan | A45B 9/02 135/72 |
| 2011/0130207 | A1 * | 6/2011 | Hasenyager | F41B 15/00 463/47.2 |
| 2016/0100677 | A1 * | 4/2016 | Byrnes | G02C 3/04 224/604 |

* cited by examiner

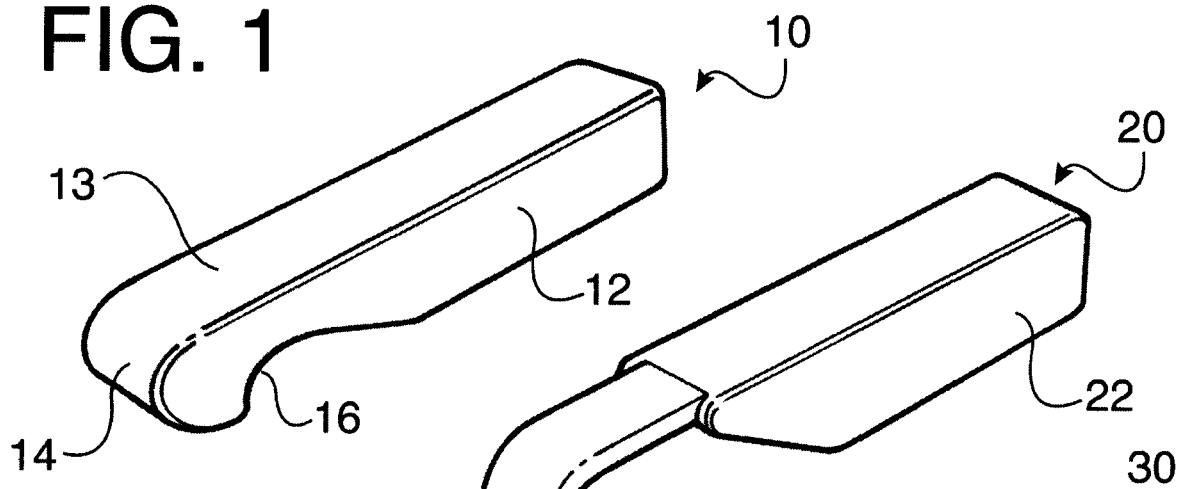
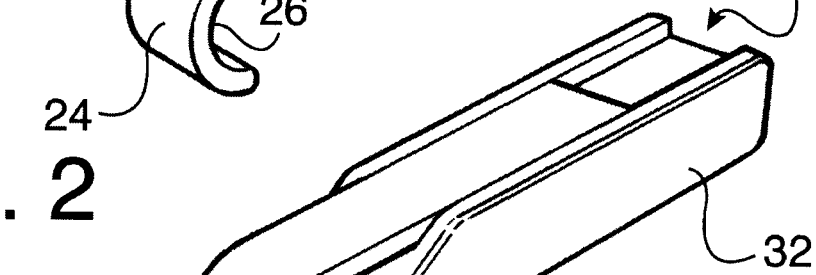
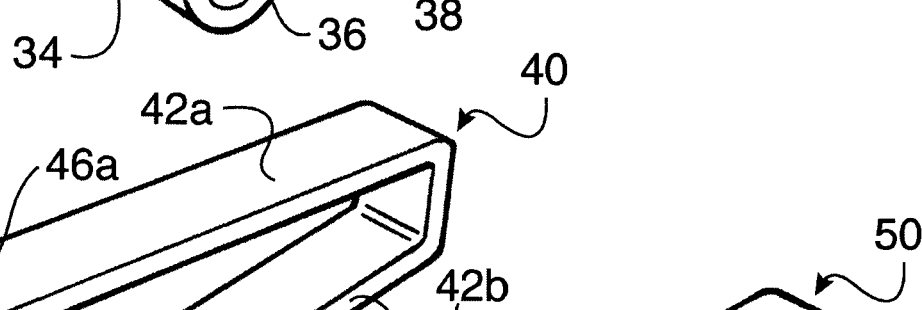
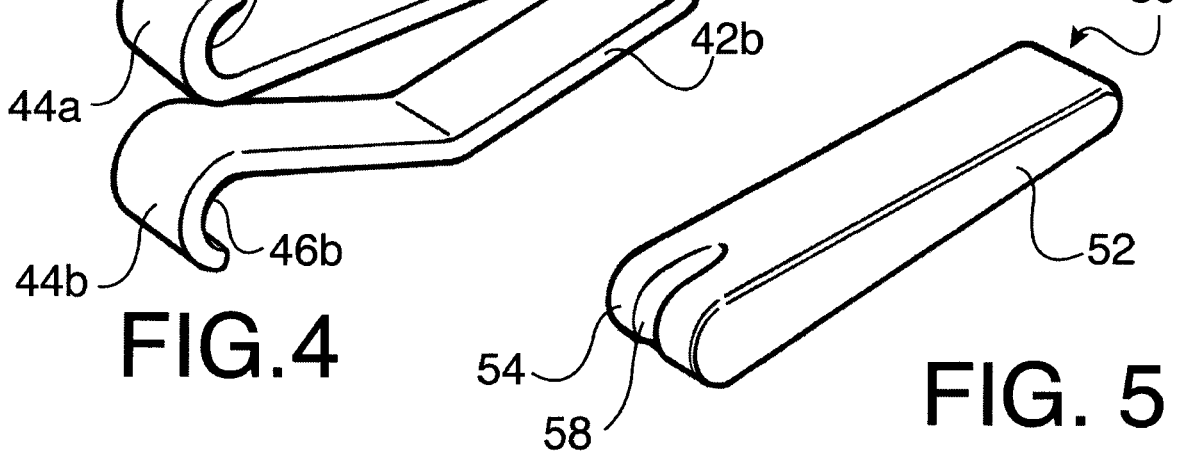

US 11,106,058 B2

HAND HELD TEMPLE BENDING TOOL

TECHNICAL FIELD

The present invention is directed toward a hand held device to assist an optician in properly bending the temples of eyeglasses.

BACKGROUND ART

Although the side members or temples of eyeglasses come in different lengths, they are generally generic in nature. That is, when produced and sold, they have a fixed shape. They are not produced specifically for each patient. Obviously patients' facial features including their eyes, noses and ears differ and the temples of the eyeglass frames must be adjusted to fit the individual patient.

The temples are adjusted normally by bending them to fit properly around a person's ear. This can be a relatively simple procedure when the frames are made from a malleable material such as most soft metals. Harder metals and some profiles cannot always be easily bent. Also, it may become somewhat more difficult to bend when the frames are made of plastic or when they are made of metal-coated with plastic.

Unlike metal frames, most plastic frames cannot simply be bent into shape. Rather, they must first be heated and then bent while they are still hot. After being bent, they are then allowed to cool. This procedure is frequently repeated several times until the proper fit is attained.

Most opticians bend the temples with their hands. This is done by holding the major length of the temple with one's fingers and palm while resting the arcuate part of the temple over the person's thumb. In this position, the optician's other hand grasps the distal end of the temple and bends it utilizing the thumb as a mandrel. While this procedure is workable, it can be injurious to the optician since the plastic temple must be bent while it is very hot.

As an alternate to the foregoing, opticians have used pliers in the past to avoid having to utilize their thumb as the fulcrum in bending the temples. Unfortunately, this does not normally provide the accuracy that is needed.

Mechanical devices have also been proposed and patented. See, for example, U.S. Pat. Nos. 2,516,512; 2,544,067 and 2,642,765. To Applicant's knowledge, none of these proposed devices has ever been successfully produced or marketed. This could be due to the fact that each patented device is limited in its use to a very specific type of temple and is not universally adaptable to various sizes and shapes of eyeglass temples.

There is, therefore, a need for a device that can be used by an optician to easily and accurately bend the temples of eyeglasses without injuring the optician's thumb.

DISCLOSURE OF THE INVENTION

The present invention is designed to overcome the deficiencies of the prior art discussed above. According to the invention, a hand held tool for use by an optician in bending the temples of a pair of eyeglasses includes an elongated handle portion capable of being held in the palm of the optician's hand. A mandrel including a convexly formed anvil with a nonslip upper surface extends from a first end of the handle portion. A concavely formed thumb recess is located adjacent the first end of the handle portion and is located opposite the anvil. The optician's thumb fits within the recess when the handle portion is being held. The free end of an eyeglass temple is placed over the mandrel and is bent over the mandrel by the optician.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a perspective view of a first embodiment of Applicant's hand held temple bending tool;

FIG. 2 is a perspective view illustrating a second embodiment thereof;

FIG. 3 is a perspective view of a third embodiment thereof;

FIG. 4 is a perspective view of fourth embodiment of the invention;

FIG. 5 is a perspective view of a fifth embodiment thereof;

BEST MODES FOR CARRYING OUT THE INVENTION

Figure 6:
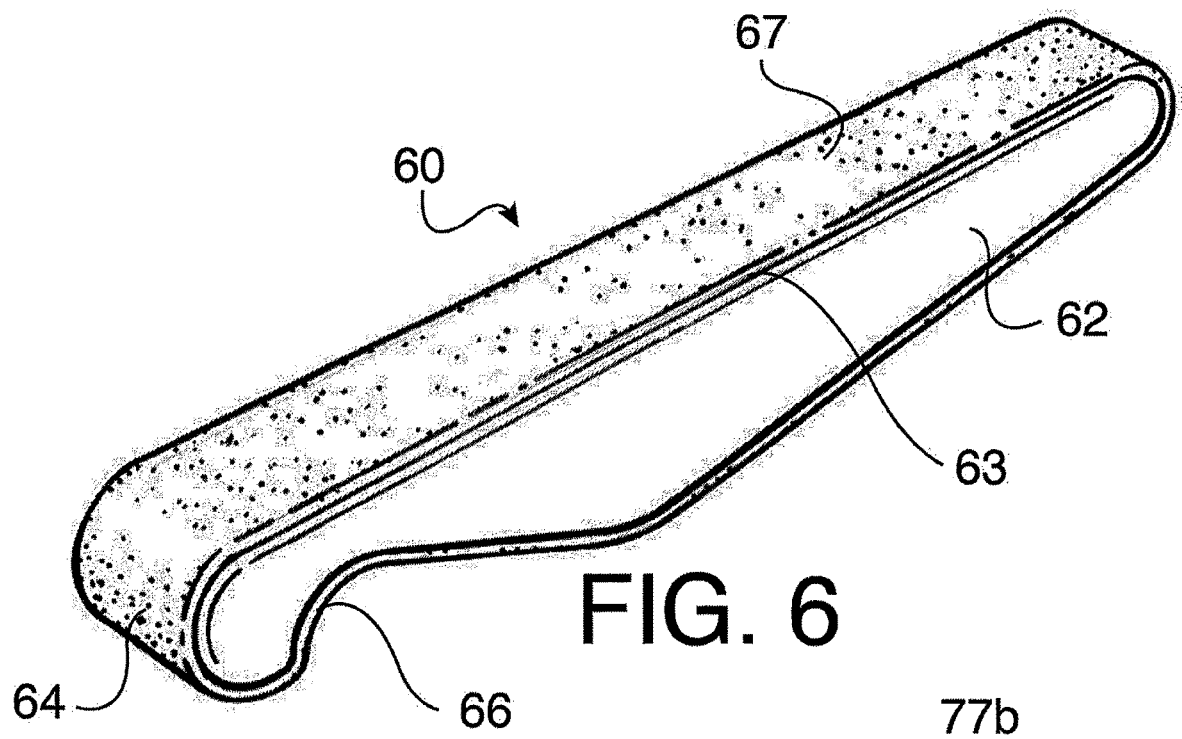
FIG. 6 is a perspective view of sixth embodiment of the invention.

Referring now to the drawings in detail, there is shown in FIG. 1 a first embodiment of the invention designated generally as 10. The bending tool 10 includes an elongated substantially rectangularly shaped body or handle 12 having an upper surface 13 and including an anvil comprised essentially of a convexly curved uppermost end 14. Formed in the undersurface of the body of the tool 10 adjacent the upper end thereof is a concavely curved thumb recess 16.

Figure 8:
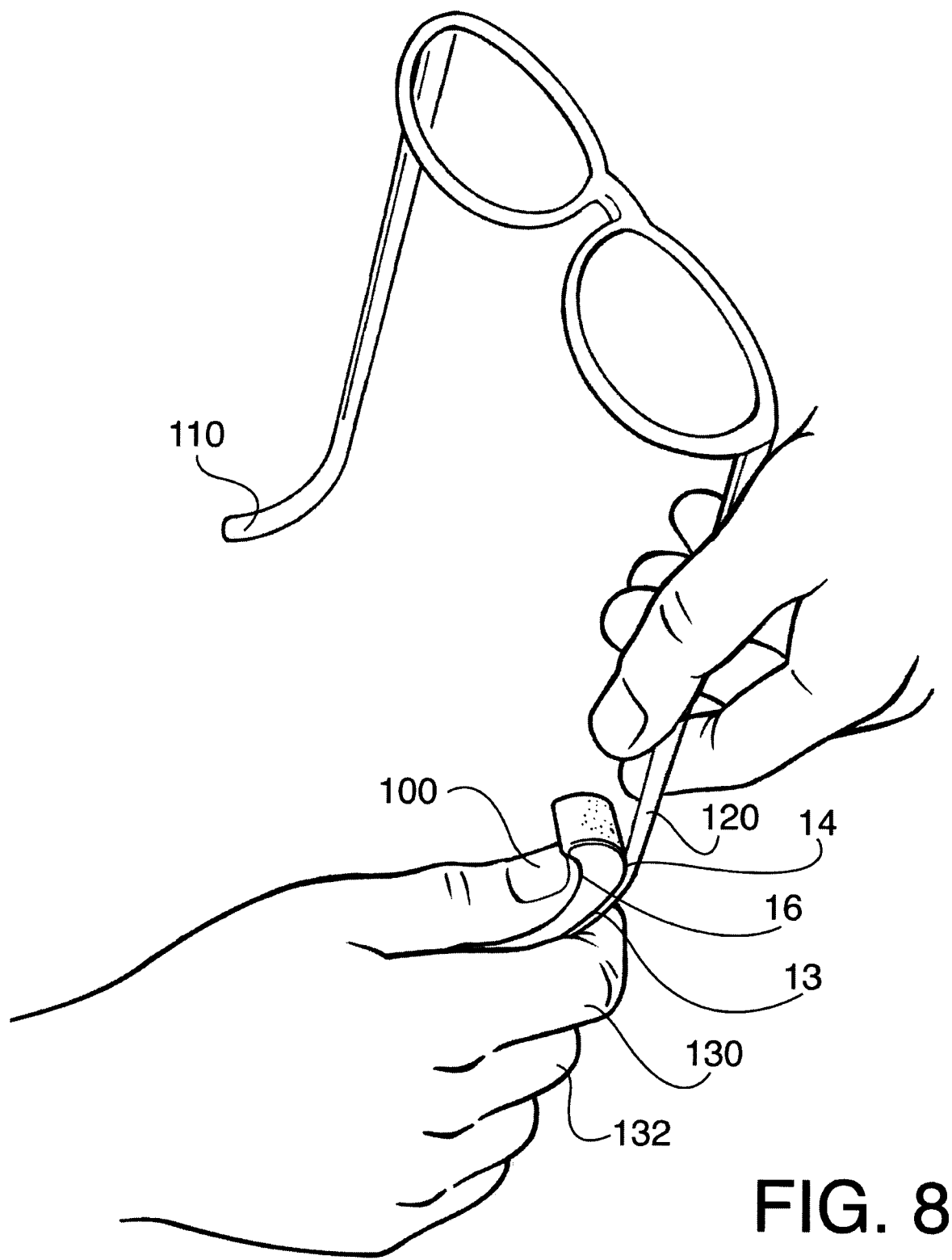
FIG. 8 is an illustration showing how the hand held temple bending tools of the present invention are utilized to bend the temples of eyeglasses.

The manner in which the tool 10 is utilized is illustrated in FIG. 8. As can be seen therein, the main body or handle portion 12 is grasped in the palm of the optician's hand with his or her thumb 100 resting within the thumb recess 16. The free end 110 of the temple 120 is held in place between the upper surface 13 of the main body portion 12 and the optician's fingers 130, 132. In this position, the end of the temple 120 that requires bending extends over the rounded end 14 of the tool 10. Utilizing the optician's other hand which is grasping the main portion of the temple 120, the temple can be bent down around the curved portion 14 as desired. This is done without the optician having to touch the hottest portion of the temple.

The hand-held bending tool of the present invention can be made of substantially any material such as metal, plastic or wood or the like. It can also be made of a single material or of multiple materials. Furthermore, it can be made of one piece such as by molding or grinding or it can be made of several pieces joined together.

FIG. 2, for example, shows a modified form of the bending tool and is illustrated generally at 20. In this second embodiment, the main body portion 22 may be made of wood or plastic while the upper end including the rounded top end 24 with the thumb recess 26 may be made of metal that extends from the plastic or wooden handle 22.

FIG. 3 shows a variation on the embodiment shown in FIG. 2. In this embodiment which shows a bending tool 30, the main body or handle portion 32 may, again, be made of wood or plastic and the bending portion including the rounded end 34 and the thumb recess 36 may be made of metal and be able to be slid in and out of the handle portion 32 to extend the length of the device. This also provides a space shown at 38 between the metal portion and the handle portion which can be used to support the end of the eyeglass temple with the main portion being bent around the curved end 34.

FIG. 4 shows another variation illustrated at 40. In this embodiment, the entire device may be made of metal that is bent into the shape shown therein. This provides an upper handle portion 42a and a lower handle portion 42b along with two end curves 44a and 44b with thumb recesses 46a and 46b.

The embodiment shown in FIG. 4 is more versatile than the several other embodiments in that either a person's thumb or forefinger can be placed into one of the recesses 46a or 46b and the free end of the eyeglass temple can be inserted between the two free rounded ends 44a and 44b and bent in either direction that is desired.

A simple form of the invention is shown in FIG. 5 and is designated generally at 50. This embodiment includes an elongated handle 52 with a rounded end 54 with a radius of about ⅜ inch with the other end also being rounded with a radius of about ⅛ inch. In lieu of the thumb recess, however, there is a groove or channel 58 formed in the center portion of the rounded end 54. The eyeglass temple can be held in substantially the same manner as shown in FIG. 8 but the groove 58 acts as a guide to keep the end of the temple 100 straight as it is bent over the curved end. A nonslip surface as described below could be used in addition to or in lieu of the groove.

Figure 7:
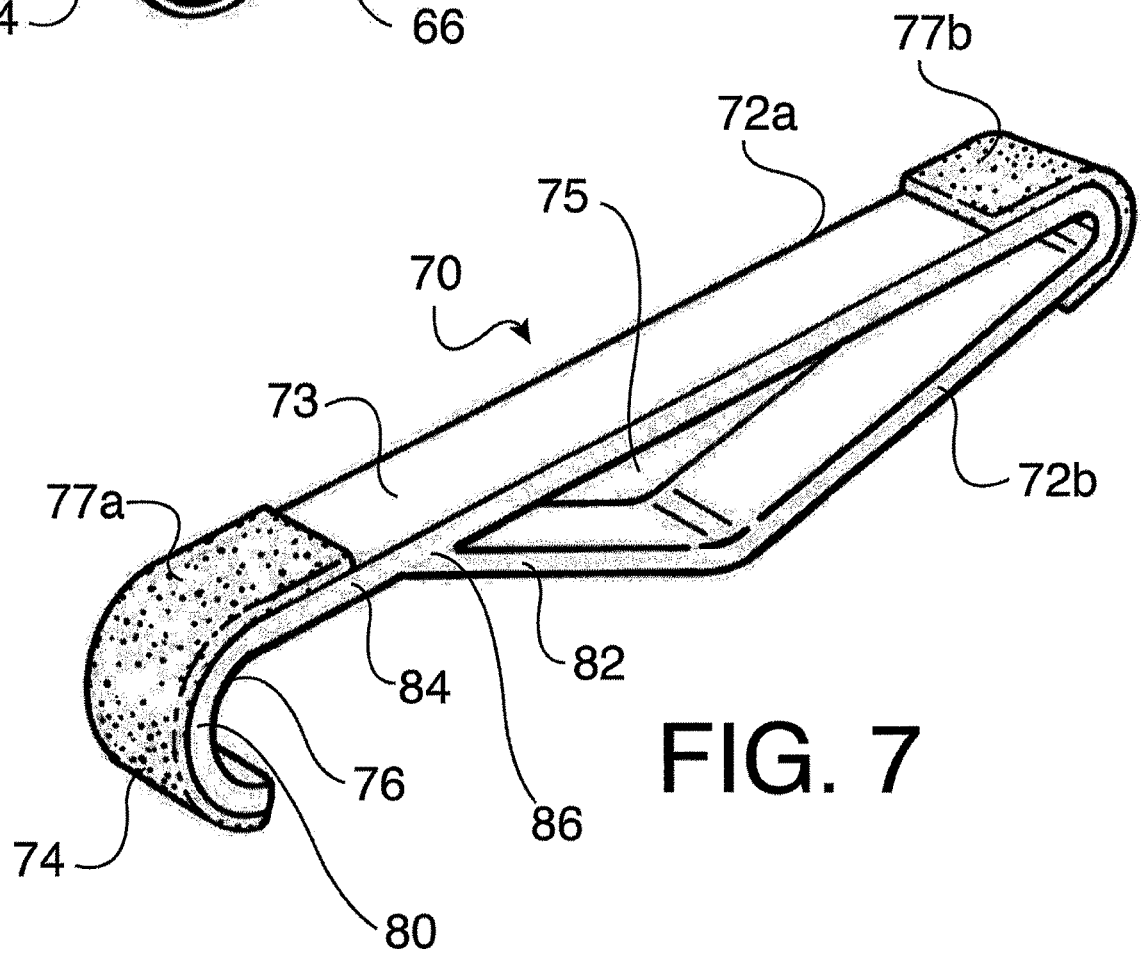
FIG. 7 is a perspective view of a seventh embodiment thereof.

FIGS. 6 and 7 illustrate even further embodiments of the invention and are identified as 60 and 70. In FIG. 6, the one piece body 62 may be made of wood or plastic or substantially any solid material and similarly includes a thumb recess 66 and an anvil in the form of a curved end 64. To prevent the eyeglass temple from slipping across the surface of the tool when it is being worked on, the upper surface 63 and the bottom surface of the body 62 is covered with a rubbery nonslip material such as shown at 67. The nonslip material may be rubber or leather or similar material and also functions to prevent marring of the frame.

In this preferred embodiment of FIG. 6, the entire upper and lower surfaces are covered by the nonslip material. More or less areas, however, could be covered and be within the scope of the invention. The important parts to cover are, of course, the working areas where the temple of the eyeglasses my touch the body of the tool.

FIG. 7, for example, shows a similar tool 70 made of a strip of metal, preferably stainless steel. The strip of metal has a first end 80 that forms the thumb recess 76 and the convex anvil 74. The strip of metal is bent around itself so that the second end 82 of the strip of metal abuts or touches the undersurface of an intermediate section 84 of the metal. Preferably, the second end is welded to the undersurface as shown at 86. In any event, there is left a hollow center such as shown at 75. In this embodiment, the handle is essentially formed from the intermediate section 84 of the strip of metal and is comprised of upper handle portion 72a and lower handle portion 72b with the hollow center 75 in between. As shown in FIG. 7, the upper handle portion 72a is flat and planar throughout its length whereas the second handle portion 72b first bends downwardly away from the first handle portion and then bends back upwardly where the second end 82 is welded to the undersurface of the intermediate section 84 as shown at 86 thus forming the hollow center 75 which is open on both sides of the handle. As is also shown, at least portions of the upper surface 73 of the tool 70 include rubbery like nonslip coverings such as shown at 77a and 77b. It is also possible to cover additional parts of the tool 70 with a nonslip surface or even the entire surface thereof as with the embodiment shown in FIG. 6.

The present invention may be embodied in other specific forms without departing from the spirit or essential attributes thereof and accordingly reference should be made to the appended claims rather than to the foregoing specification as indicating the scope of the invention.

The invention claimed is:

1. A method of bending the temples of a pair of eyeglasses including the steps of:
   providing a hand held tool for use by an optician that includes an elongated handle portion capable of being held in the palm of the optician's hand, said tool having a mandrel including a convexly formed anvil extending from a first end of said handle portion, and a concavely formed thumb recess located adjacent said first end of said handle portion opposite said anvil;
   said optician holding said handle portion in his or her hand and placing his or her thumb within said thumb recess;
   placing the free end of the temple of a pair of eyeglasses over the mandrel and holding the same in place by the same hand holding the handle, and
   utilizing the optician's other hand, bending said temple over said mandrel.

2. A hand held tool for use by an optician in bending the temples of a pair of eyeglasses comprising:
   a strip of metal having a first end and a second end and an intermediate section between said ends, said strip of metal being bent around itself and having said second end abutting said intermediate section so as to form an elongated handle portion with a hollow center, said handle portion being capable of being held in the palm of the optician's hand,
   said first end of said strip of metal forming a mandrel including a convexly formed anvil extending from said handle portion, and
   a concavely formed thumb recess located under said anvil, the optician's thumb being adapted to fit within said recess when said handle portion is being held.

3. The hand held tool for use by an optician in bending the temples of a pair of eyeglasses as claimed in claim 2 wherein said second end is welded to said intermediate section.

4. The hand held tool for use by an optician in bending the temples of a pair of eyeglasses as claimed in claim 2 wherein said handle is made of stainless steel.

5. The hand held tool for use by an optician in bending the temples of a pair of eyeglasses as claimed in claim 2 wherein said mandrel is covered by a nonslip material.

6. The hand held tool for use by an optician in bending the temples of a pair of eyeglasses as claimed in claim 5 wherein said nonslip material is leather.

7. The hand held tool for use by an optician in bending the temples of a pair of eyeglasses as claimed in claim 5 wherein the end of said handle opposite said mandrel is also covered by a nonslip material.

8. A hand held tool for use by an optician in bending the temples of a pair of eyeglasses comprising:
   a strip of metal having a first end and a second end and an intermediate section between said ends, said strip of metal being bent around itself and having said second end abutting said intermediate section so as to form an elongated handle portion with a hollow center, said handle portion having an upper handle portion and a lower handle portion, said upper handle portion being substantially flat and planar throughout its length, said lower handle portion bends downwardly away from said upper handle portion and then back upwardly to form said hollow center, said handle portion being capable of being held in the palm of the optician's hand, said first end of said strip of metal forming a mandrel including a convexly formed anvil extending from said handle portion, and a concavely formed thumb recess located under said anvil, the optician's thumb being adapted to fit within said recess when said handle portion is being held.

9. The hand held tool for use by an optician in bending the temples of a pair of eyeglasses as claimed in claim 8 wherein said strip of metal used to form said tool is a single continuous strip of metal.

10. The hand held tool for use by an optician in bending the temples of a pair of eyeglasses as claimed in claim 9 wherein said second end is welded to said intermediate section.

11. The hand held tool for use by an optician in bending the temples of a pair of eyeglasses as claimed in claim 9 wherein said handle is made of stainless steel.

12. The hand held tool for use by an optician in bending the temples of a pair of eyeglasses as claimed in claim 9 wherein said mandrel is covered by a nonslip material.

13. The hand held tool for use by an optician in bending the temples of a pair of eyeglasses as claimed in claim 12 wherein said nonslip material is leather.

14. The hand held tool for use by an optician in bending the temples of a pair of eyeglasses as claimed in claim 12 wherein the end of said handle opposite said mandrel is also covered by a nonslip material.

15. A method of bending the temples of a pair of eyeglasses by an optician including the steps of:

providing a hand held tool that includes a strip of metal having a first end and a second end and an intermediate section between said ends, said strip of metal being bent around itself and having said second end abutting said intermediate section so as to form an elongated handle portion with a hollow center, said handle portion having an upper handle portion and a lower handle portion, said upper handle portion being substantially flat and planar throughout its length, said lower handle portion bends downwardly away from said upper handle portion and then back upwardly to form said hollow center, said handle portion being capable of being held in the palm of an optician's hand, said first end of said strip of metal forming a mandrel including a convexly formed anvil extending from said handle portion, and a concavely formed thumb recess located under said anvil, the optician's thumb being adapted to fit within said recess when said handle portion is being held;

said optician holding said handle portion in his or her hand and placing his or her thumb within said thumb recess;

placing the free end of the temple of a pair of eyeglasses over the mandrel and holding the same in place by the same hand holding the handle, and utilizing the optician's other hand, bending said temple over said mandrel.

\* \* \* \* \*